United States Patent
Felberg et al.

(10) Patent No.: US 11,439,853 B2
(45) Date of Patent: Sep. 13, 2022

(54) RAPID-ACTION VALVE FOR A PRESSURIZED EXTINGUISHING FLUID CONTAINER, AND EXTINGUISHING FLUID CONTAINER COMPRISING SAME

(71) Applicant: Minimax GmbH, Bad Oldesloe (DE)

(72) Inventors: Jan Felberg, Lubeck (DE); Wolfgang Habitzl, Neumitterndorf (AT)

(73) Assignee: Minimax GmbH, Bad Oldesloe (DE)

( * ) Notice: Subject to any disclaimer, the term of this patent is extended or adjusted under 35 U.S.C. 154(b) by 228 days.

(21) Appl. No.: 16/090,554

(22) PCT Filed: Apr. 6, 2017

(86) PCT No.: PCT/EP2017/058282
§ 371 (c)(1),
(2) Date: Oct. 1, 2018

(87) PCT Pub. No.: WO2017/174740
PCT Pub. Date: Oct. 12, 2017

(65) Prior Publication Data
US 2019/0111290 A1    Apr. 18, 2019

(30) Foreign Application Priority Data

Apr. 7, 2016   (DE) .................... 10 2016 205 772.3

(51) Int. Cl.
*A62C 13/64*    (2006.01)
*A62C 13/76*    (2006.01)
(Continued)

(52) U.S. Cl.
CPC .............. *A62C 13/64* (2013.01); *A62C 13/76* (2013.01); *A62C 35/02* (2013.01); *F16K 1/12* (2013.01); *F16K 1/30* (2013.01); *F16K 1/465* (2013.01)

(58) Field of Classification Search
CPC ... A62C 13/64; A62C 13/76; A62C 13/00–78; A62C 35/68; A62C 35/02;
(Continued)

(56) References Cited

U.S. PATENT DOCUMENTS 3,860,073 A * 1/1975 Willms .................. F16K 31/383
251/43
5,370,189 A * 12/1994 Deist ...................... A62C 13/76
169/62
(Continued)

FOREIGN PATENT DOCUMENTS

| CN | 1424929 A | 6/2003 |
| CN | 1898029 A | 1/2007 |

(Continued)

OTHER PUBLICATIONS

International Search Report (with English translation), International Application No. PCT/EP2017/058282 (published under WO 2017/174740), 10 pages (dated Aug. 28, 2017).
(Continued)

*Primary Examiner* — Tuongminh N Pham
*Assistant Examiner* — Juan C Barrera
(74) *Attorney, Agent, or Firm* — Perkins Coie LLP

(57) ABSTRACT

The invention relates to a quick-opening valve for a pressurized extinguishing fluid vessel, having an extinguishing fluid inlet (4), an extinguishing fluid outlet (5), a flow chamber which extends from the extinguishing fluid inlet (4) to the extinguishing fluid outlet (5), a valve piston (12), a valve seat (10), wherein the valve piston is movable back and forth between an opened-up position and a shut-off position such that the valve piston (12) and the valve seat (10), in the shut-off position, bear against one another in fluid-tight fashion and, in the opened-up position, are spaced apart from one another such that the extinguishing fluid inlet
(Continued)

(4) and the extinguishing fluid outlet (5) are fluidically connected to one another. It is proposed according to the invention that the extinguishing fluid inlet (4) and the extinguishing fluid outlet (5) are oriented substantially parallel to one another.

26 Claims, 4 Drawing Sheets

(51) Int. Cl.
    *A62C 35/02*     (2006.01)
    *F16K 1/12*     (2006.01)
    *F16K 1/30*     (2006.01)
    *F16K 1/46*     (2006.01)

(58) Field of Classification Search
CPC ... F16K 1/12; F16K 1/126; F16K 1/30; F16K 1/465; F16K 31/1223; F16K 17/00; F16K 31/1221; F16K 31/1226; F16K 15/063; F16K 1/123
USPC ...... 137/219–222, 68.23; 169/71–89, 19–22, 169/9, 56–57
See application file for complete search history.

(56) References Cited

U.S. PATENT DOCUMENTS

| | | | | |
|---|---|---|---|---|
| 6,216,721 B1* | 4/2001 | Perez | | F16K 1/126 137/219 |
| 6,871,802 B2* | 3/2005 | Stilwell | | F16K 1/305 169/19 |
| 8,910,653 B2* | 12/2014 | McAuliffe | | F16K 31/1226 137/220 |
| 9,121,510 B2* | 9/2015 | Volovec | | F16K 1/126 |
| 2009/0250123 A1* | 10/2009 | Matsubara | | F16K 27/0209 137/528 |
| 2012/0285551 A1* | 11/2012 | Lewandowski | | F16K 15/063 137/511 |
| 2013/0098639 A1* | 4/2013 | Dunster | | A62C 13/66 169/9 |
| 2013/0306172 A1* | 11/2013 | Volovec | | F16K 31/53 137/556 |
| 2014/0124059 A1* | 5/2014 | McAuliffe | | F16K 31/1223 137/492 |
| 2017/0114914 A1* | 4/2017 | Esveldt | | F16K 17/00 |

FOREIGN PATENT DOCUMENTS

| | | | |
|---|---|---|---|
| CN | 102274602 A | 12/2011 | |
| CN | 202761948 U | 3/2013 | |
| DE | 20 2007 006631 | 3/2008 | |
| EP | 0033062 | 8/1981 | |
| EP | 0380852 | 8/1990 | |
| EP | 0 666 087 A1 | 8/1995 | |
| EP | 0 614 391 B1 | 2/1997 | |
| EP | 1 510 235 A1 | 3/2005 | |
| EP | 2428714 | 9/2010 | |
| GB | 1 208 497 A | 10/1970 | |
| NL | WO2015197312 | * 12/2015 | ............... F16K 1/12 |
| NL | WO2015197312 A1 | * 12/2015 | ............... F16K 1/12 |
| WO | WO 9826876 | 6/1998 | |
| WO | WO 2006110148 | 10/2006 | |

OTHER PUBLICATIONS

Office Action (with English translation), Chinese Application No. CN 201780022502.6, 24 pages (dated May 25, 2020).

* cited by examiner

RAPID-ACTION VALVE FOR A PRESSURIZED EXTINGUISHING FLUID CONTAINER, AND EXTINGUISHING FLUID CONTAINER COMPRISING SAME

PRIORITY CLAIM AND INCORPORATION BY REFERENCE

This application is a 35 U.S.C. § 371 application of International Application No. PCT/EP2017/058282, filed Apr. 6, 2017, which claims the benefit of German Application No. 10 2016 205 772.3, filed Apr. 7, 2016, each of which is incorporated by reference in its entirety.

TECHNICAL FIELD

The present invention relates to a quick-opening valve for a pressurized extinguishing fluid vessel. The invention furthermore relates to a pressurized extinguishing fluid vessel having a quick-opening valve of said type.

BACKGROUND AND SUMMARY OF THE INVENTION

The expression "quick-opening valve" is to be understood according to the invention to mean in particular a gas bottle quick-opening valve in accordance with DIN EN ISO 17871, or with a corresponding standard. A quick-opening valve is to be understood to mean all valves which, by contrast to conventional gas bottle valves or other valves, must make the pressurized fluid available in a very short time. Quick-opening valves according to the invention are particularly preferably used on static pressurized extinguishing fluid vessels.

Known quick-opening valves have an extinguishing fluid inlet and an extinguishing fluid outlet, and a flow chamber which extends from the extinguishing fluid inlet to the extinguishing fluid outlet. For distinction between a rest state of the extinguishing fluid vessel and a triggered state of the extinguishing fluid vessel, the known quick-opening valves have a valve piston and a valve seat, wherein the valve piston is movable back and forth between an opened-up position and a shut-off position such that the valve piston and the valve seat, in the shut-off position, bear against one another in fluid-tight fashion and, in the opened-up position, are spaced apart from one another such that the extinguishing fluid inlet and the extinguishing fluid outlet are fluidically connected to one another.

According to the invention, the expression "valve" is to be understood to mean devices which can be switched back and forth between an opened-up position and a shut-off position in a non-destructive and reversible manner, that is to say without exchange/repair of functional parts. Devices which block the fluidic connection by means of destructible rupturing elements, for example rupturing disks or the like, and which, once opened up, can be reused only after replacement of the destroyed rupturing element, are not to be understood as valves.

In the case of the known quick-opening valves, the extinguishing fluid inlet and the extinguishing fluid outlet are normally arranged at right angles relative to one another. The extinguishing fluid which flows out of the extinguishing fluid vessel in the triggered state is diverted through this corresponding angle as it flows through the quick-opening valve, before said extinguishing fluid emerges from the valve. In certain situations, this may have the effect that a lateral impetus is exerted on the extinguishing fluid vessel to which the quick-opening valve is attached, which impetus generates a movement of the extinguishing fluid vessel and in the worst case leads to said extinguishing fluid vessel falling over or spinning around in uncontrolled fashion. This is regarded as a safety risk.

Accordingly, the invention was based on the object of improving a quick-opening valve of the type mentioned in the introduction such that the operational safety is improved. Furthermore, the invention was based in particular on the object of improving a quick-opening valve of the type mentioned in the introduction such that the dimensions of said quick-opening valve can be reduced.

According to a first aspect, the invention achieves the object on which it is based, in the case of a quick-opening valve of the type mentioned in the introduction, in that the extinguishing fluid inlet and the extinguishing fluid outlet are oriented substantially parallel to one another. The extinguishing fluid inlet and the extinguishing fluid outlet are preferably oriented coaxially with respect to one another. Here, the invention pursues the approach that the standing stability and thus in particular the operational safety of an extinguishing fluid vessel is improved if the extinguishing fluid emerging from the quick-opening valve does not generate any lateral movement impetus relative to the longitudinal axis of the extinguishing fluid vessel. Here, the longitudinal axis of the extinguishing fluid vessel is to be understood to mean the direction in which the extinguishing fluid emerges from the extinguishing fluid vessel. In the case of standard extinguishing fluid vessels which are designed in the form of gas bottles and which are rotationally symmetrical, this is to be understood to mean the axis of rotation, which in the installed state of the quick-opening valve on the extinguishing fluid vessel is simultaneously coaxial with a central axis of the extinguishing fluid inlet. Thus, in the case of the preferably parallel, in particular coaxial, orientation of extinguishing fluid inlet and extinguishing fluid outlet, the movement impetus generated as a result of the extinguishing fluid emerging from the quick-opening valve acts in the longitudinal direction of the extinguishing fluid vessel and is absorbed by the standing surface of the extinguishing fluid vessel. In this way, the extinguishing fluid vessel is substantially prevented from spinning around in an uncontrolled manner or moving laterally.

The quick-opening valve preferably has a resetting means which is operatively connected to the valve piston and which is designed to apply a resetting force to the valve piston in the direction of the shut-off position.

In a preferred refinement, the resetting means that is preferably provided comprises a spring, in particular a preloaded spring.

In a preferred embodiment of the quick-opening valve, the valve piston is arranged within the flow chamber and is movable substantially parallel, in particular coaxially, with respect to the extinguishing fluid inlet and extinguishing fluid outlet. In comparison with conventional quick-opening valves, this leads to a considerable reduction in the structural height, because, in the case of conventional quick-opening valves, the piston is arranged at least partially outside the flow chamber.

In a further preferred embodiment, the quick-opening valve has a piston housing in which the valve piston is mounted so as to be movable, in particular displaceable, wherein the piston housing is arranged in the flow chamber so as to be flowed around by extinguishing fluid when the valve piston is in the opened-up position. Between an outer wall of the flow chamber and the piston housing, there is preferably provided a substantially ring-shaped flow channel. It is particularly preferable if the flow channel has a constant free cross-sectional area at least in sections along its profile, preferably over at least two thirds of its length and/or of its circumference. The piston housing is furthermore preferably connected to the valve body by means of at least one holding web. The holding web extends in particular through the otherwise ring-shaped flow channel. The holding webs are preferably of droplet-shaped form in the flow direction in order to generate the least possible flow resistance. As an alternative to a droplet shape, an oval, parabolic, elliptical or cylindrical shape of the holding webs is for example preferred.

In one preferred embodiment, the valve piston has a surface which faces toward the extinguishing fluid inlet and which, in the opened-up position, does not protrude out of the surface, surrounding the valve piston, of the piston housing. The surface of the valve piston preferably terminates flush with the surrounding surface of the piston housing, and particularly preferably transitions in continuous fashion, that is to say without sharp bends, into the surface of the piston housing. It is achieved in this way that the extinguishing fluid flowing into the quick-opening valve in the open can flow past the valve piston and the surrounding surface of the piston housing with the least possible turbulence.

The surface of the valve piston which faces toward the extinguishing fluid inlet is preferably convexly curved. It is furthermore preferable for the piston housing, in sections or in its entirety, to be convexly curved. The piston housing particularly preferably has a droplet-shaped external contour. This also follows the approach of designing the piston housing to be as streamlined as possible in the interior of the flow chamber.

In this way, at the same time, a quick-opening valve is realized which exhibits a very low pressure loss between extinguishing fluid inlet and extinguishing fluid outlet, which promotes a rapid discharge of the extinguishing fluid.

In a particularly preferred embodiment, the valve piston is designed as a differential pressure piston. Here, a differential pressure piston is to be understood to mean that the piston has a first and a second piston surface with different surface sizes (projected in the direction of action of the piston), which piston surfaces are each acted on by the same pressure, preferably by virtue of the two piston surfaces being situated in spaces which are fluidically connected to one another. The valve piston is preferably designed such that that surface of the valve piston which faces toward the extinguishing fluid inlet is a first surface, and the valve piston has a second surface, which is averted from the extinguishing fluid inlet and which is larger than the first surface, wherein the second surface delimits a piston chamber which is connected via a pressure equalization line to the extinguishing fluid inlet. Owing to the larger form of the second surface, there is a resultant force in the direction of the extinguishing fluid inlet. This corresponds to a force in the direction of the shut-off position of the valve piston. The design of the valve piston as a differential pressure piston thus constitutes a preferred (further) resetting means which permits reliable shutting-off of the valve.

In a further preferred embodiment, the valve seat of the quick-opening valve has a radial seat surface, and the valve piston has a radial sealing element which is designed to bear in fluid-tight fashion against the radial seat surface of the valve seat in the shut-off position.

The radial sealing element is preferably arranged entirely within the piston housing when the valve body is in the opened-up position. Excessive wear of the radial sealing element, and inadvertent damage, which could lead to blockages and malfunctions, are hereby reliably ruled out.

In a further preferred embodiment of the invention, in the piston housing, there is provided an overpressure line which extends from the side of the extinguishing fluid inlet to the side of the extinguishing fluid outlet and which is closed off with respect to a passage of fluid by means of an overpressure safety device. The overpressure safety device is to be understood to mean an overpressure-preventing safety device.

In one refinement of the quick-opening valve according to the invention, the overpressure line is designed to discharge the overpressure in the direction of the extinguishing fluid outlet after triggering of the overpressure safety device. It is thus made possible, after triggering of the overpressure safety device, for the extinguishing fluid situated in an extinguishing fluid vessel on which the quick-opening valve according to the invention is installed to be discharged not into the surroundings but into the extinguishing agent path connected to the quick-opening valve, in particular an extinguishing fluid line. Thus, a contamination of the surroundings and possible hazard to persons situated in the surroundings of the triggering overpressure safety device are avoided.

The overpressure safety device is preferably designed as a rupturing element. As a rupturing element, use is for example made of a rupturing disk, rupturing cap, rupturing screw or rupturing enclosure. When a predetermined overpressure on the side of the extinguishing fluid inlet is exceeded, the rupturing element fails and opens up the overpressure line, through which extinguishing fluid can then escape to the extinguishing fluid outlet irrespective of the position of the valve body.

Overpressures typically arise if the extinguishing fluid vessel is intensely heated. After a critical temperature has been exceeded, triggering of the overpressure safety device occurs, such that extinguishing fluid is discharged in the direction of the connected sprinkler system. Said extinguishing fluid can then be distributed uniformly via the nozzles of the sprinkler system in the room before the actual activation of the extinguishing system is performed by means of, for example, a triggering device.

The valve piston is preferably designed as a hollow piston, and the overpressure line extends through the hollow piston. It is thus preferable for the hollow piston to form a part of the overpressure line. Alternatively or in addition, the hollow piston accommodates a supply piston which is fluidically connected to the extinguishing fluid inlet. The overpressure safety device is preferably arranged, at that end of the supply channel which is situated opposite the extinguishing fluid inlet, in the direction of the extinguishing fluid outlet.

In one preferred embodiment, the piston housing has at least one receptacle for the movable valve piston, wherein the overpressure line extends through the receptacle. Aside from the valve piston, the piston housing that accommodates the valve piston also has at least one section of the overpressure line, which extends from the extinguishing fluid inlet in the direction of the extinguishing fluid outlet. The receptacle for the movable valve piston is preferably designed as a pipe section by means of which the valve piston is guided movably in the longitudinal direction of the pipe section and transferred from its shut-off position into its opened-up position. Furthermore, the receptacle makes it possible for the extinguishing fluid present in the overpressure line to be conducted.

The overpressure line preferably has one or more line sections which extend(s) coaxially with respect to the central axis of the valve piston and/or of the piston housing. The overpressure line is preferably formed by a supply piston of the valve piston, the receptacle in the form of a pipe body, and a hold-down means for, in particular, the rupturing element in the overpressure line, wherein the hold-down means likewise comprises at least one passage for the extinguishing fluid. Provision is furthermore made for further passages and bores to be provided in the piston housing, parallel with respect to the hold-down means, in an outflow body of the piston housing, which passages and bores likewise form sections of the overpressure line in one embodiment. A reliable discharge of the extinguishing fluid after triggering of the overpressure safety device is thus realized.

The arrangement and design of the overpressure line in the quick-opening valve serve to prevent the occurrence of a situation in which, after triggering of the overpressure safety device, movement impetuses are generated within the quick-opening valve transversely with respect to the flow direction of the extinguishing fluid flowing from the extinguishing fluid inlet in the direction of the extinguishing fluid outlet of the quick-opening valve. It is then also the case upon the triggering of the overpressure safety device that the emergence of the extinguishing fluid in the direction of the extinguishing fluid outlet has no influence on the standing stability of the extinguishing fluid vessel.

In a further preferred embodiment, the quick-opening valve has a ventilation valve and has a triggering device which controls the ventilation valve, wherein the ventilation valve and/or the triggering device are arranged on the valve body so as to be laterally angled, preferably at right angles, relative to the direction of the extinguishing fluid inlet and of the extinguishing fluid outlet. The ventilation valve is installed on the valve body in a ventilation channel. By means of the lateral arrangement of the triggering device and of the ventilation valve, a considerably reduced structural height is realized. The triggering device is actuatable preferably electrically, manually, pneumatically or by means of a combination of several or all of these types.

The quick-opening valve according to the invention furthermore preferably comprises a unit for monitoring whether a triggering device has been installed. For example, the unit is equipped with a mechanical limit switch monitoring means. Here, by means of a mechanically movable button, it is monitored whether the triggering device has been installed. During the installation process, the button is deflected as soon as the triggering device has been installed in the designated position. The button position is for example monitored manually/visually and/or electronically.

The triggering device is preferably installed by means of a plug-in connection. The plug-in connection is secured for example of a splint which is received in two preferably semicircular grooves, wherein in each case one of the grooves is formed in the triggering device and one of the grooves is formed on the valve body, preferably on a receptacle for the triggering device, and said grooves are arranged opposite one another when the triggering device is in the installed position, such that the splint can be inserted. The removal of the triggering device from the quick-opening valve then requires a removal of the splint, such that the two grooves can be displaced relative to one another again.

In a further embodiment of the quick-opening valve, which is simultaneously also an independent second aspect of the invention, the quick-opening valve of the type mentioned in the introduction or a quick-opening valve according to one of the preferred embodiments described above has an evacuation channel for the drainage of extinguishing fluid from the piston chamber in the direction of the extinguishing fluid inlet of the quick-opening valve, wherein the evacuation channel is oriented parallel, or at an acute angle, relative to the extinguishing fluid inlet of the quick-opening valve, and, in the evacuation channel, there is arranged a closure element which is movable between a shut-off position and an opened-up position by means of gravitational force. Here, an acute angle is to be understood to mean an angle between the evacuation channel and the orientation of the extinguishing fluid inlet of >0° and <90°. The closure element is preferably arranged so as to be freely movable, at least freely displaceable in the evacuation channel, under the action of gravitational force. The combination of the orientation of the evacuation channel and the provision of the movable closure element has the following technical effect: when an extinguishing fluid vessel equipped with the quick-opening valve is transported horizontally, extinguishing fluid may accumulate in the piston chamber owing to the fluidic connection between the extinguishing fluid inlet and the piston chamber. Without an evacuation channel, it may, in extreme situations, be the case that the extinguishing fluid that accumulates in the piston chamber prevents a complete opening of the valve piston, giving rise to an increased flow resistance and an associated pressure loss of the quick-opening valve. Without an evacuation channel, there would then be the risk of a reduction of the opening speed and thus of a potential disruption of the quick opening function. However, if, after potentially being transported horizontally, the extinguishing fluid vessel is moved into an upright position, which corresponds to the normal situation for the storage of the extinguishing fluid vessel at the location of use, the closure element falls under the action of gravitational force, owing to its inherent weight, into the opened-up position, in which the evacuation channel is fluidically connected to the extinguishing fluid inlet.

In this way, the extinguishing fluid that has possibly accumulated in the piston chamber in the interim can drain through the evacuation channel. However, if the quick-opening valve is triggered by means of the triggering device and the piston chamber is ventilated (and thus the valve piston is moved into the opened-up position), the closure element is, owing to the fluid pressure prevailing on the inlet side, pushed out of the opened-up position and into the shut-off position. The closure element is designed to bear in fluid-tight fashion against a correspondingly designed seat in the shut-off position. The seat for the closure element is preferably formed as a conical surface, preferably in the evacuation channel, and the closure element is designed to be at least partially elastically deformable, for example by means of an elastomer. The closure element is particularly preferably designed as a ball, in order to realize a low-friction movement within the evacuation channel with simultaneously minimal risk of misalignment.

In a third aspect of the present invention, which is simultaneously a refinement of the aspects described above, in the piston housing on the quick-opening valve of the type mentioned in the introduction, there is provided an overpressure line which extends from the side of the extinguishing fluid inlet to the side of the extinguishing fluid outlet and which is closed off with respect to a passage of fluid by means of an overpressure safety device and which is designed to discharge the overpressure in the direction of the extinguishing fluid outlet after triggering of the overpressure safety device. The invention is based on the realization that, with the triggering of the overpressure safety device, extinguishing fluid is now no longer discharged into the surroundings in the region of the quick-opening valve, but rather is preferably discharged in the direction of the extinguishing fluid outlet and thus into an extinguishing agent path connected downstream of the quick-opening valve, in particular into an extinguishing fluid line connected to the quick-opening valve. An uncontrolled discharge to the outside of the quick-opening valve, and a possible associated hazard to persons, as in the prior art, are thus avoided. Furthermore, a critical pressure normally arises at the overpressure safety device when for example the extinguishing agent or extinguishing fluid vessel is heated by and/or a fire and said vessel is thus additionally pressurized. The extinguishing agent or extinguishing fluid that flows out after triggering of the overpressure safety device is then not discharged in uncontrolled fashion, but rather passes via the extinguishing fluid line into a sprinkler system connected thereto, which sprinkler system then discharges the extinguishing fluid uniformly in the room via the nozzles of the sprinkler system. The extinguishing fluid inlet and the extinguishing fluid outlet are preferably oriented substantially parallel to one another.

The quick-opening valve according to the second and third aspects furthermore preferably comprises one, several or all of the above-described preferred embodiments relating to the quick-opening valve according to the first.

The invention achieves the object on which it is based, in the case of an extinguishing fluid vessel mentioned in the introduction, which has an extinguishing fluid chamber, an extinguishing fluid outlet and a quick-opening valve which is installed at the extinguishing fluid outlet, by virtue of the quick-opening valve being designed in accordance with one of the above-described preferred embodiments or aspects. With regard to the advantages and preferred embodiments of the extinguishing fluid vessel, reference is made to the statements above.

The quick-opening valve preferably has a valve body which is installed internally in the extinguishing fluid outlet of the extinguishing fluid vessel. Alternatively, the quick-opening valve has a valve body which is installed only partially internally or externally at the extinguishing fluid outlet, preferably in each case by means of a corresponding thread.

It is furthermore preferable for a riser pipe to be fluidically connected to the extinguishing fluid inlet of the quick-opening valve and arranged within the extinguishing fluid chamber.

BRIEF DESCRIPTION OF THE DRAWINGS

The invention will be described below with reference to the appended figures on the basis of a preferred exemplary embodiment, in which.

MODE(S) FOR CARRYING OUT THE INVENTION

Figure 1:
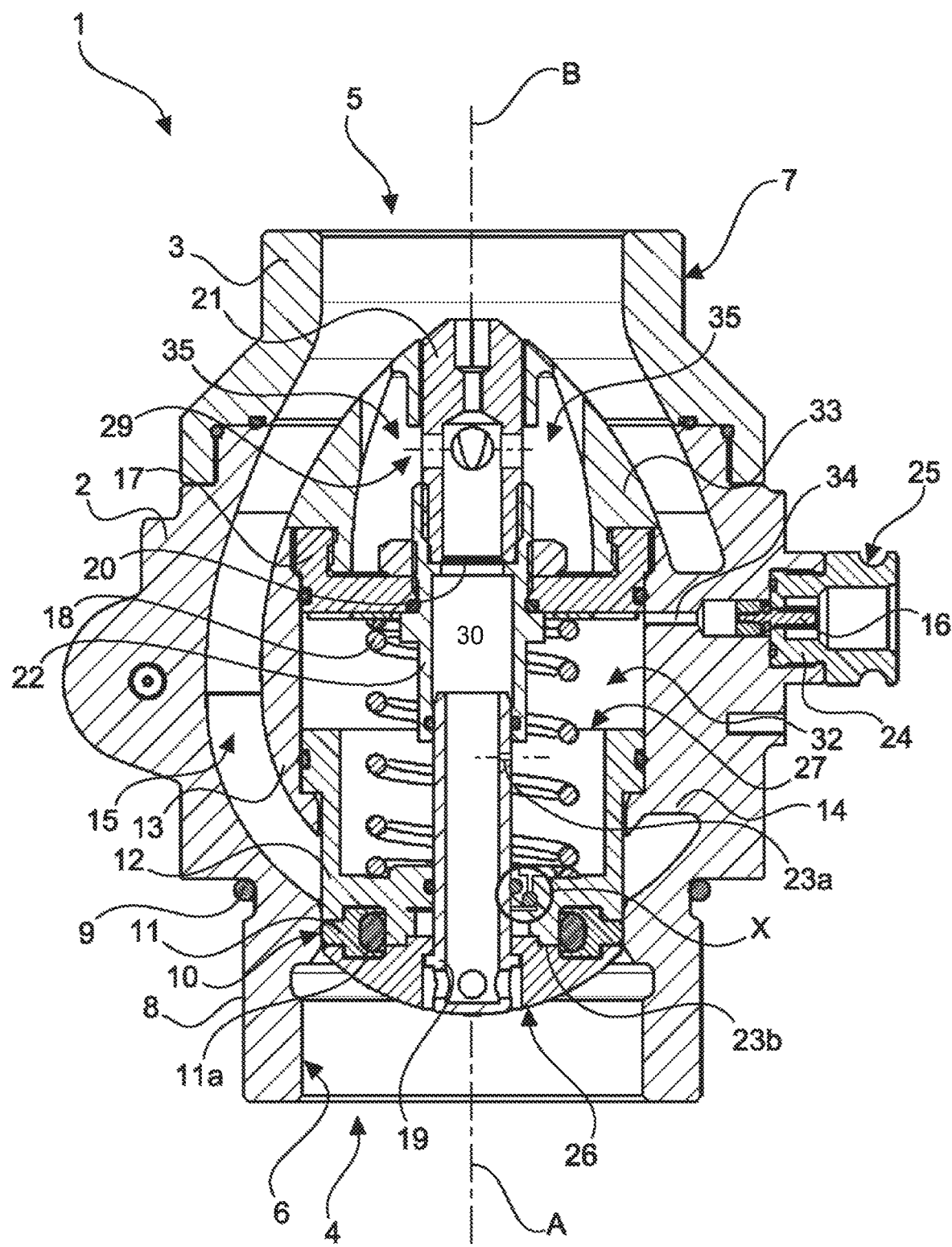
FIG. 1 shows a cross-sectional view through a quick-opening valve according to a preferred exemplary embodiment in a first operating state.
Figure 4:
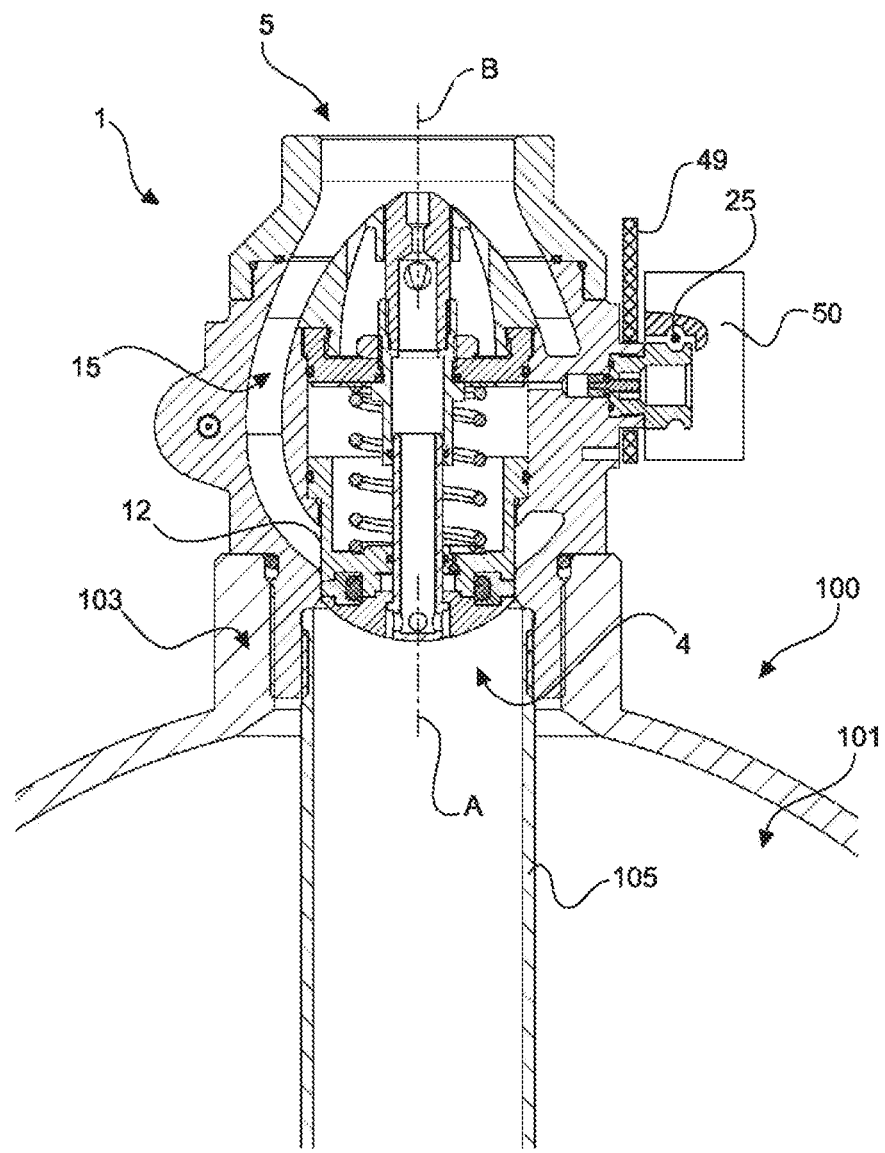
FIG. 4 shows a schematic cross-sectional view of an extinguishing fluid vessel with the quick-opening valve as per FIGS. 1 to 3.

FIG. 1 firstly illustrates a quick-opening valve 1 which is designed in accordance with a preferred exemplary embodiment of the invention. The quick-opening valve 1 has a valve body 2. A valve cover 3 is preferably fastened to the valve body 2. The quick-opening valve 1 has an extinguishing fluid inlet 4 in the direction of an axis A and has an extinguishing fluid outlet 5 in the direction of an axis B, wherein the extinguishing fluid outlet 5 is in this case formed preferably on the valve cover 3. On the side of the extinguishing fluid inlet 4, the quick-opening valve 1 has a fastening section 6 for the connection of a riser pipe 105 (FIG. 4). At the side of the extinguishing fluid outlet 5, the quick-opening valve 1 has a fastening section 7 for an extinguishing line. Said fastening section 7 may optionally be formed on the outer or inner side of the valve cover 3 and/or valve body 2. At the side of the extinguishing fluid inlet 4, there is furthermore preferably formed an attachment thread 8 for the attachment of an extinguishing fluid vessel 100 (FIG. 4), and preferably a seal element 9.

The quick-opening valve 1 has a valve seat 10. In the shut-off state of the quick-opening valve 1 as shown in FIG. 1, a radial sealing element 11 is in fluid-tight contact with the valve seat 10. The valve seat 10 is designed as a radial sealing seat. The radial sealing element 11 is held in substantially positively locking fashion in the valve piston 12, cf. the explanations relating to FIG. 2. The valve piston 12 is, in the shut-off position shown in FIG. 1, in fluid-tight contact with the valve seat 10.

The radial sealing element 11 has a secondary radial sealing element 11a at its radially inner side.

The valve piston 12 is arranged in linearly movable fashion in a piston housing 13. The piston housing 13 is connected by means of at least one holding web 14 to the valve body 2. The holding web 14 is preferably of streamlined design.

Between the extinguishing fluid inlet 4 and the extinguishing fluid outlet 5, there is formed a flow chamber 15. The piston housing 13 is arranged within the flow chamber 15 such that a substantially ring-shaped flow channel forms between the piston housing 13 and the valve body 2, said flow channel being interrupted only by the at least one holding web 14.

In the interior of the piston housing, there is arranged a cover 17 which delimits a piston chamber 32 and closes off the latter in fluid-tight fashion. On the cover 17, there is supported a resetting means 18 in the form of a preloaded spring, which deflects the valve piston 12 in the direction of the shut-off position shown.

A supply piston 19 is arranged in the interior of the valve piston 12. The supply piston 19 is fluidically connected to the extinguishing fluid inlet 4.

The supply piston 19 is arranged displaceably in a receptacle 22 which, in turn, is fastened to the cover 17. Between the receptacle 22 and a hold-down means 21, there is arranged an overpressure-preventing safety device 20 in the form of a rupturing disk. In the supply piston 19, there is provided a pressure equalization line 23a, which connects the interior of the supply piston 19 to the piston chamber 32.

From the piston chamber 32, a ventilation channel 34 extends toward a ventilation valve 16 which is attached laterally to the valve body 2, which ventilation valve is closed in the position shown. Likewise arranged laterally, and so as to radially surround the ventilation channel, is a receptacle 24 for a triggering device. The receptacle 24 has a quick-action closure 25 for the fastening of a triggering device 50 (FIG. 4).

The valve piston 12 is designed as a differential pressure piston, as follows: the valve piston 12 has a first piston surface 26, which faces toward the extinguishing fluid inlet 4. Furthermore, the valve piston 12 has a second piston surface 27, which faces toward the interior of the piston chamber 32. The area, projected perpendicularly to the direction of the axis A of the extinguishing fluid inlet 4, of the second piston surface 27 is larger than the projected area of the first piston surface 26. Since the piston chamber 32 is connected in communicating fashion to the extinguishing fluid inlet 4 by means of the pressure equalization line 23a through the composite piston 19, a resultant force in the direction of the shut-off position shown in FIG. 1 acts on the valve piston 12 in the presence of an overpressure. In this way, it is possible for the resetting means 18 to be designed to be relatively weak, in order to safeguard against undesired vibration, for example.

Figure 2:
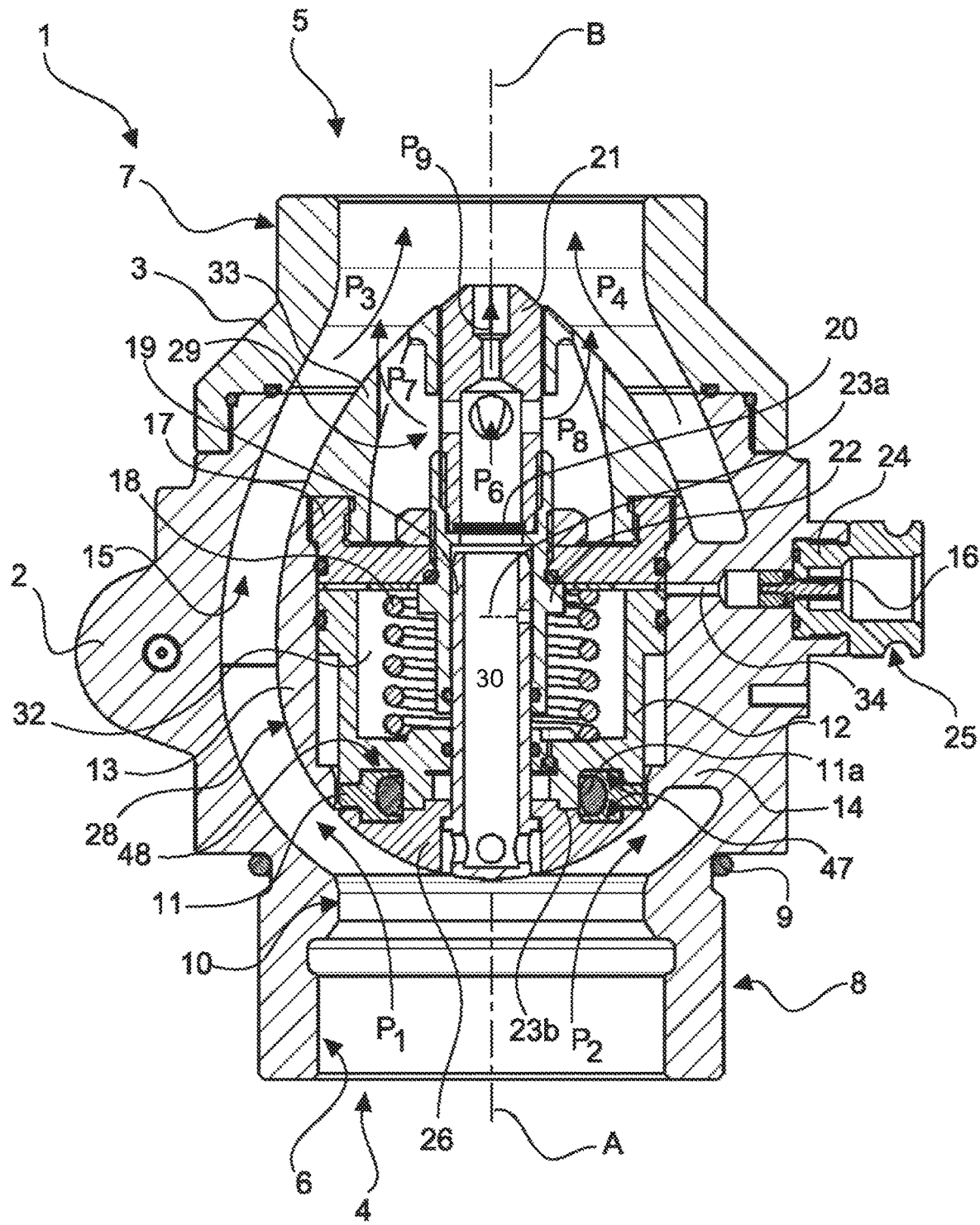
FIG. 2 shows a cross-sectional view through the quick-opening valve as per FIG. 1 in a second operating state.

The function of the overpressure-preventing safety device 20 is substantially as follows: if an inadmissibly high overpressure prevails at the extinguishing fluid inlet 4, the safety device 20 triggers and permits a flow of fluid. Extinguishing fluid can flow through the supply piston 19, and passes through one or more passages 29 and one or more bores 35 in an outflow body 33 of the piston housing 13 to the extinguishing fluid outlet 5 of the quick-opening valve 1. This takes place irrespective of the position of the valve piston 12 and of the switching state of the ventilation valve 24. The extinguishing fluid escapes substantially in the direction of the arrows P6, P7, P8 and P9 shown in FIG. 2 in the event of the triggering of the safety device 20. The supply piston 19, the receptacle 22 and the hold-down means 21 form, together with the passages and the bores 35 in the outflow body 33, an overpressure line 30 through which the extinguishing fluid flows from the side of the extinguishing fluid inlet 4 to the side of the extinguishing fluid outlet 5 when the safety device 20 triggers. Referring still to FIG. 2, the operation of the quick-opening valve 1 will be discussed below. If the ventilation valve 24 is actuated proceeding from the shut-off state as per FIG. 1, the pressure in the piston chamber 32 rapidly falls. The cross section of the ventilation channel 34 is considerably larger than the cross section of the pressure equalization line 23a. As a result, the resultant force that holds the valve piston 12 in the shut-off position is no longer maintained owing to the differential pressure between the two piston surfaces 26, 27 (FIG. 1), and the valve piston 12 returns from the shut-off position as per FIG. 1 into the opened-up position as per FIG. 2.

The radial sealing element 11 is now arranged in a concealed manner within the piston housing 13, and extinguishing fluid can enter the flow chamber 15 along the arrows P1 and P2, flows around the at least one holding web 14, and finally passes out of the quick-opening valve again from the extinguishing fluid outlet 5 coaxially in the direction of the axis B, in the direction of the arrows P3 and P4. Here, the advantage of a coaxial arrangement of the extinguishing fluid inlet 4, which is oriented in the direction of the axis A, and of the extinguishing fluid outlet 5, which is oriented in the direction of the axis B, is particularly clear. The force generated owing to the discharge of the extinguishing fluid acts in the direction of the extinguishing fluid vessel. Assuming that the extinguishing fluid vessel is likewise oriented substantially coaxially with respect to the axis A or B, said force is transmitted directly into the standing surface of the extinguishing fluid vessel, and no tilting moment or no lateral movement of the vessel arises.

In the open state, owing to the overpressure still prevailing on the side of the extinguishing fluid inlet 4, the (weak) resetting means 18 is held in the compressed position. This state is maintained until almost all of the extinguishing fluid has escaped from the extinguishing fluid vessel. Only toward the end of the evacuation process is the resetting means 18 strong enough to push the valve piston 12 from its position shown in FIG. 2 in the direction of the shut-off position. According to the invention, the primary function of the resetting means 18 is to reliably close the quick-opening valve in the unpressurized state or in the presence of only a low residual pressure, in particular below 2 bar overpressure, preferably in the region of 1 bar+/−30% overpressure, on the side of the extinguishing fluid inlet 4, in order to prevent an ingress of dirt and moisture into the interior of the extinguishing fluid vessel 100 (FIG. 4).

It can also be seen from FIG. 2 that the radial sealing element 11 has two projections 47. The valve piston 12 has a corresponding recess 48 for receiving the projections 47. The projections 47 and recess 48 interact in the form of an undercut, which holds the radial sealing element 11 in a captively retained manner on the valve piston 12. The piston housing 13 preferably has a second pressure equalization line 23b, by means of which the recess 48 and the radial sealing element 11 arranged in the recess 48 are pressurized, radially from the inside, with the pressure of the extinguishing fluid from the side of the extinguishing fluid inlet 4. The pressurization from this side ensures a contact pressure of the radial sealing element 11 against the valve seat 10 in the shut-off position, as per FIG. 1. For better sealing against said valve seat in a radial direction, the secondary radial sealing element 11a is formed from a more flexible material than the radial sealing element 11. The radial sealing element 11 is preferably formed from graphite or from a wear-resistant elastomer, for example polyurethane, whereas the secondary radial sealing element 11a is preferably formed from a soft elastomer, for example EPDM (ethylene propylene diene monomer) or NBR (nitrile butadiene rubber).

With regard to the form of the valve housing 13 in interaction with the valve body 2, the following is pointed out: in the opened-up position shown in FIG. 2, the surface 26 of the valve piston, which is convexly curved, and the surrounding surface 28 of the piston housing 13, which is likewise convexly curved, transition into one another as smoothly as possible, such that the passing flow of the extinguishing fluid in the direction of the arrows P1, P2 does not generate any additional turbulence, or at least generates the least possible turbulence. The surface 28 also extends in a flowing manner over the outflow body 33 into the valve cover 3 to the merging point of the extinguishing fluid flow (arrows P3, P4). This is conducive to limiting the flow resistance and thus the pressure loss between the extinguishing fluid inlet 4 and the extinguishing fluid outlet 5.

Figure 3:
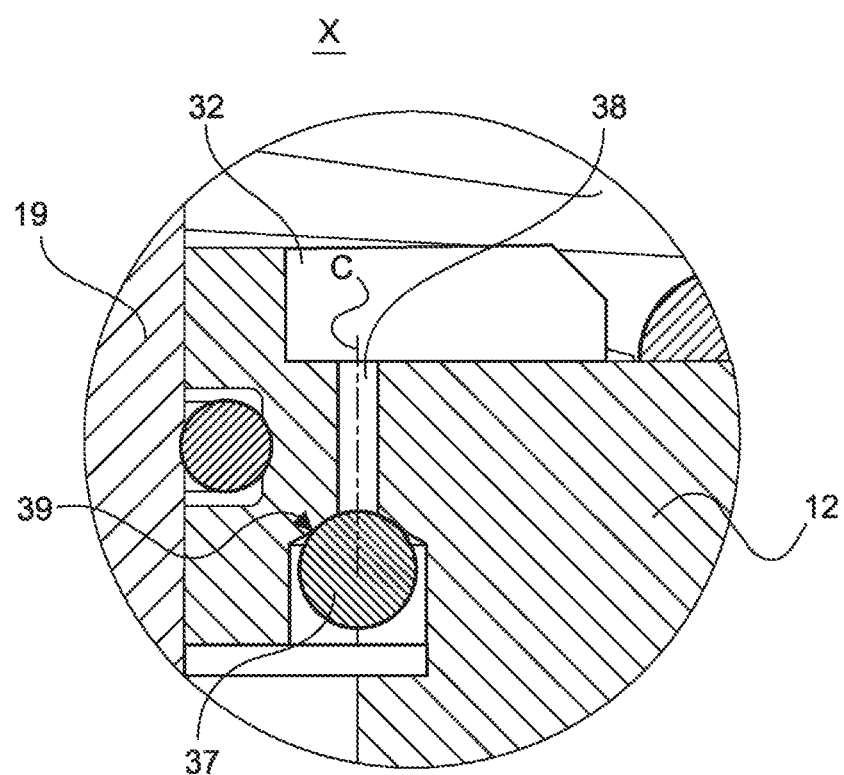
FIG. 3 shows a detail view X of the quick-opening valve as per FIGS. 1 and 2.

The detail X indicated in FIG. 1 is shown on an enlarged scale in FIG. 3. An evacuation channel 38 extends from the piston chamber 32 in the direction of the extinguishing fluid inlet 4 (not illustrated) in the direction of an axis C. The axis C is, in the present exemplary embodiment, oriented parallel, preferably alternatively at an acute angle, with respect to the axes A, B. In the evacuation channel 38, there is formed a conical seat 39, and there is arranged a closure element 37 which is movable substantially freely in the evacuation channel 38. In the present case, the closure element 37 is designed as a partially elastic ball, which in the position shown in FIG. 3 is pressed in fluid-tight fashion against the conical seat 39 in the evacuation channel 38.

If the pressure in the piston chamber 32 has been equalized with the pressure at the extinguishing fluid inlet 4 (not illustrated), that is to say in the rest state of the extinguishing fluid vessel, the closure element 37 falls, owing to its gravitational force, out of the position shown in FIG. 3 as soon as the extinguishing fluid vessel has been placed into an upright position. Extinguishing fluid that has previously accumulated in the piston chamber 32, for example owing to horizontal transport, can then escape through the opened evacuation channel 38 in the direction of the extinguishing fluid inlet 4. In the event of a triggering of the ventilation valve 16 (FIGS. 1 and 2), the pressure in the piston chamber 32 rapidly falls, and as a result of the prevailing pressure difference, the closure element 37 is pressed against the conical seat 39, such that an undesired backflow of extinguishing fluid during the triggering process is avoided. The pressure equalization in the rest state takes place via the pressure equalization line 23a in the supply piston 19. Between the supply piston 19 and valve piston 12, there is formed a ring-shaped gap through which the extinguishing fluid can drain in the direction of the fluid inlet 4.

Whereas FIGS. 1 to 3 have shown a quick-opening valve 1 according to the preferred exemplary embodiment of the invention on its own, the quick-opening valve 1 according to those figures is shown in FIG. 4 in conjunction with an extinguishing fluid vessel 100. The extinguishing fluid vessel 100 has an extinguishing fluid chamber 101 in which a pressurized extinguishing fluid is stored. The extinguishing fluid vessel furthermore has an extinguishing fluid outlet 103, which is connected to the corresponding attachment of a quick-opening valve 1 according to the invention. To the extinguishing fluid inlet 4 of the quick-opening valve 1 there is fastened a riser pipe 105, which extends into the extinguishing fluid chamber 101. It would alternatively also be possible for the riser pipe 105 to be fastened to the extinguishing fluid vessel 100 itself.

In FIGS. 1 to 3, the following parts were not shown, but there illustrated here in the assembly with the quick-opening valve 1: a triggering device 50 is fastened to the ventilation valve 24 by means of the quick-action closure 25, preferably by means of a plug-in connection secured by means of a splint. Furthermore, a monitoring unit 49 for checking for the presence of the triggering device 50 is installed on the quick-opening valve 1.

As can be seen from FIG. 4, as a result of the coaxial arrangement of extinguishing fluid inlet 4 and extinguishing fluid outlet 5 of the quick-opening valve 1, cf. the axes A, B, an arrangement is realized in which the extinguishing fluid exits the quick-opening valve 5 in the same direction as it exits the extinguishing fluid vessel 100. Lateral movement impetuses are thus at least substantially avoided. Furthermore, as a result of the lateral attachment of the triggering device 50, a design which is very space-saving in terms of height is realized, which is additionally assisted by virtue of the valve piston 12 being accommodated in the interior of the flow chamber 15.

LIST OF UTILIZED REFERENCE NUMBERS

1 Quick-opening valve
2 Valve body
3 Valve cover
4 Extinguishing fluid inlet
5 Extinguishing fluid outlet
6 Fastening section, riser pipe
7 Fastening section, extinguishing line
8 Attachment thread, extinguishing fluid vessel
9 Seal for extinguishing fluid vessel
10 Valve seat
11 Radial sealing element
11a Secondary radial sealing element
12 Valve piston
13 Piston housing
14 Holding web
15 Flow chamber
16 Ventilation valve
17 Cover
18 Resetting means
19 Supply piston
20 Overpressure-preventing safety device
21 Hold-down means
22 Receptacle
23a,b Pressure equalization line
24 Receptacle for triggering device
25 Quick-action closure for triggering device
26 First piston surface
27 Second piston surface
28 Surface, piston housing
29 Passage
30 Overpressure line
32 Piston chamber
33 Outflow body
34 Ventilation channel
35 Bore
37 Closure element
38 Evacuation channel
39 Conical seat
47 Projection
48 Recess
49 Monitoring unit
50 Triggering device
100 Extinguishing fluid vessel
101 Extinguishing fluid chamber
103 Extinguishing fluid outlet, extinguishing fluid vessel
105 Riser pipe
A,B,C Axes
X Detail

The invention claimed is:

1. A quick-opening valve for an extinguishing fluid vessel, comprising:
an extinguishing fluid inlet disposed along an inlet axis,
an extinguishing fluid outlet disposed along an outlet axis,
a flow chamber which extends from the extinguishing fluid inlet to the extinguishing fluid outlet,
a valve piston disposed in a piston chamber, and
a valve seat, wherein the valve piston is movable back and forth between an opened-up position and a shut-off position such that the valve piston and the valve seat, in the shut-off position, bear against one another in fluid-tight fashion and, in the opened-up position, are spaced apart from one another such that the extinguishing fluid inlet and the extinguishing fluid outlet are fluidically connected to one another,
wherein the inlet axis of the extinguishing fluid inlet and the outlet axis of the extinguishing fluid outlet are substantially aligned to one another,
wherein the valve piston comprises a hollow valve piston that, in the shut-off position, fluidically connects the extinguishing fluid inlet and the piston chamber,
wherein the hollow valve piston defines a central flow passage having a central axis aligned with the inlet axis of the extinguishing fluid inlet,
wherein the valve seat has a radial seat surface parallel to the inlet axis, and the valve piston carries a radial sealing element which is designed to bear in fluid-tight fashion against the radial seat surface of the valve seat in the shut-off position,
wherein the radial sealing element has at least one axially extending projection, and the valve piston has at least one corresponding, axially extending recess in which the projection is received, and wherein the recess is connected by a pressure equalization line to the extinguishing fluid inlet.

2. The quick-opening valve as claimed in claim 1, further comprising a piston housing in which the valve piston is mounted so as to be movable, wherein the piston housing is arranged in the flow chamber so as to be flowed around by extinguishing fluid when the valve piston is in the opened-up position.

3. The quick-opening valve as claimed in claim 2, wherein, in the piston housing, there is provided an overpressure line which extends from the extinguishing fluid inlet to the extinguishing fluid outlet and which is closed off with respect to a passage of fluid by an overpressure safety device.

4. The quick-opening valve as claimed in claim 1, wherein the radial sealing element is held within the hollow valve piston and is arranged entirely within a piston housing when the hollow valve piston is in the opened-up position.

5. A quick-opening valve for an extinguishing fluid vessel, comprising:
an extinguishing fluid inlet disposed along an inlet axis,
an extinguishing fluid outlet disposed along an outlet axis,
a flow chamber which extends from the extinguishing fluid inlet to the extinguishing fluid outlet,
a valve piston disposed in a piston chamber,
a valve seat, wherein the valve piston is movable back and forth between an opened-up position and a shut-off position such that the valve piston and the valve seat, in the shut-off position, bear against one another in fluid-tight fashion and, in the opened-up position, are spaced apart from one another such that the extinguishing fluid inlet and the extinguishing fluid outlet are fluidically connected to one another, and
a piston housing in which the valve piston is mounted so as to be movable, wherein the piston housing is arranged in the flow chamber so as to be flowed around by extinguishing fluid when the valve piston is in the opened-up position,
wherein the inlet axis of the extinguishing fluid inlet and the outlet axis of the extinguishing fluid outlet are substantially aligned to one another,
wherein the valve piston comprises a hollow valve piston that, in the shut-off position, fluidically connects the extinguishing fluid inlet and the piston chamber,
wherein the hollow valve piston defines a central flow passage having a central axis aligned with the inlet axis of the extinguishing fluid inlet,
wherein, in the piston housing, there is provided an overpressure line which extends from the extinguishing fluid inlet to the extinguishing fluid outlet and which is closed off with respect to a passage of fluid by an overpressure safety device, and
wherein the overpressure line is designed to discharge the overpressure in fluid communication with the extinguishing fluid outlet after triggering of the overpressure safety device,
wherein the overpressure safety device is a rupturing element, which is arranged in a section of the overpressure line.

6. The quick-opening valve as claimed in claim 5, further comprising:
a resetting means including a spring which is operatively connected to the valve piston and which is designed to apply a resetting force to the valve piston in a direction of the shutoff position.

7. The quick-opening valve as claimed in claim 5, wherein the valve piston has a surface which faces toward and is directly exposed to the extinguishing fluid inlet and which, in the opened-up position, does not protrude out of a surface, surrounding the valve piston, of the piston housing.

8. The quick-opening valve as claimed in claim 7, wherein the inlet axis of the extinguishing fluid inlet and the outlet axis of the extinguishing fluid outlet are arranged coaxially.

9. The quick-opening valve as claimed in claim 7, wherein the valve piston is arranged within the flow chamber and is movable substantially parallel with respect to the inlet axis of the extinguishing fluid inlet and the outlet axis of the extinguishing fluid outlet.

10. The quick-opening valve as claimed in claim 7, wherein that surface of the valve piston which faces toward the extinguishing fluid inlet is convexly curved.

11. The quick-opening valve as claimed in claim 7, wherein the piston housing, in sections or in its entirety, is convexly curved.

12. The quick-opening valve as claimed in claim 11, wherein the flow chamber, in sections or in its entirety, is concavely curved correspondingly to the convexly curved, sections or entirety, of the piston housing.

13. The quick-opening valve as claimed in claim 7, wherein the hollow valve piston is designed as a differential pressure piston, and wherein the hollow valve piston comprises a supply piston with a pressure equalization line to fluidically connect the extinguishing fluid inlet and the piston chamber.

14. The quick-opening valve as claimed in claim 5, wherein the piston housing is fixedly connected to a valve body by at least one holding web.

15. The quick-opening valve as claimed in claim 5,
wherein the valve seat has a radial seat surface parallel to the inlet axis, and the valve piston carries a radial sealing element which is designed to bear in fluid-tight fashion against the radial seat surface of the valve seat in the shut-off position.

16. The quick-opening valve as claimed in claim 15, wherein the radial sealing element has at least one axially extending projection, and the valve piston has at least one corresponding, axially extending recess in which the projection is received.

17. The quick-opening valve as claimed in claim 5, wherein the overpressure line extends through the hollow valve piston.

18. The quick-opening valve as claimed in claim 17, wherein the piston housing has at least one receptacle for a supply piston arranged on an interior of the hollow valve piston, wherein the overpressure line extends through the at least one receptacle and the supply piston.

19. The quick-opening valve as claimed in claim 5, wherein the overpressure line has one or more line sections which extend coaxially with respect to a central axis of the hollow valve piston and/or of the piston housing.

20. The quick-opening valve as claimed in claim 5, further comprising a ventilation valve and having a triggering device which controls the ventilation valve, wherein the ventilation valve and/or the triggering device are arranged on a valve body so as to be laterally angled relative to a direction of the inlet axis of the extinguishing fluid inlet and of the outlet axis of the extinguishing fluid outlet.

21. The quick-opening valve as claimed in claim 20, comprising a unit for monitoring whether a triggering device has been installed.

22. The quick-opening valve as claimed in claim 20, wherein the triggering device is installed by a plug-in connection.

23. The quick-opening valve as claimed in claim 5,
wherein the hollow valve piston has an evacuation channel for drainage of extinguishing fluid from the piston chamber to the extinguishing fluid inlet of the quick-opening valve, the evacuation channel is oriented parallel, or at an acute angle, relative to the inlet axis of the extinguishing fluid inlet, and, in the evacuation channel, there is arranged a closure element which is movable back and forth between a shut-off position and an opened-up position by gravitational force in a direction of the opened-up position.

24. An extinguishing fluid vessel comprising:
an extinguishing fluid chamber,
an extinguishing fluid outlet, and
a quick-opening valve as claimed in claim 5 installed at the extinguishing fluid outlet,
wherein the quick-opening valve has a valve body which is installed internally in the extinguishing fluid outlet, wherein the piston housing is fixedly connected to the valve body by at least one holding web, wherein the valve piston has a surface which faces toward and directly exposed to the fluid inlet and which, in an opened-up position of the valve piston, does not protrude out of a surface, surrounding the valve piston, of the piston housing, wherein a radial sealing element is held within a recess of the valve piston, and wherein the radial sealing element bears against a valve seat of the valve body outside the piston housing in a shut-off position of the valve piston and is arranged entirely within the piston housing in the opened-up position of the valve piston.

25. The extinguishing fluid vessel as claimed in claim 24, wherein a riser pipe is fluidically connected to the fluid inlet of the quick-opening valve and is arranged within the extinguishing fluid chamber.

26. The extinguishing fluid vessel as claimed in claim 24, wherein the overpressure line extends from a side of the fluid inlet to a side of the extinguishing fluid outlet.

* * * * *